(12) United States Patent
Clasen et al.

(10) Patent No.: US 10,003,546 B1
(45) Date of Patent: Jun. 19, 2018

(54) BANDWIDTH OVERRIDE

(71) Applicant: Cox Communications, Inc., Atlanta, GA (US)

(72) Inventors: Daniel Clasen, Fayetteville, GA (US);
Lior Koren, Sudbury, MA (US);
Franco Morales, Woodstock, GA (US);
Carson Banov, Vero Beach, FL (US);
Shubh Singhi, Johns Creek, GA (US);
Joshua Edward Fierstein, Clearwater, FL (US); Douglas David Gravino, Roswell, GA (US)

(73) Assignee: Cox Communications, Inc., Atlanta, GA (US)

( * ) Notice: Subject to any disclaimer, the term of this patent is extended or adjusted under 35 U.S.C. 154(b) by 388 days.

(21) Appl. No.: 13/681,389

(22) Filed: Nov. 19, 2012

(51) Int. Cl.
G06F 15/173 (2006.01)
H04L 12/919 (2013.01)
H04L 12/801 (2013.01)
H04L 12/24 (2006.01)

(52) U.S. Cl.
CPC ........ H04L 47/765 (2013.01); H04L 41/0896 (2013.01); H04L 41/5022 (2013.01); H04L 41/5029 (2013.01); H04L 47/10 (2013.01)

(58) Field of Classification Search
CPC . H04L 12/5695; H04L 41/0896; H04L 43/16;
H04L 47/781; H04L 47/823; H04L
12/1467; H04L 12/1489; H04L 12/2898;
H04L 29/06027; H04L 41/5003; H04L
41/5029; H04L 47/10; H04L 47/122;
H04L 47/2433; H04L 41/0813; H04L
41/22; H04L 41/5051; H04L 41/5054;
H04L 41/509; H04L 47/25; H04L 47/522;
H04L 63/10; H04N 21/2402; H04N 21/24
USPC ....... 709/203, 221, 223, 226, 227, 228, 233;
370/230, 233, 235, 395.4, 468, 477
See application file for complete search history.

(56) References Cited

U.S. PATENT DOCUMENTS

| 7,751,320 | B2 | 7/2010 | Nuzman et al. | |
|---|---|---|---|---|
| 8,014,273 | B1 * | 9/2011 | Barrett et al. | ................. 370/210 |
| 2002/0065907 | A1 * | 5/2002 | Cloonan | ............. H04L 12/2801 709/223 |
| 2005/0237952 | A1 | 10/2005 | Punj et al. | |
| 2006/0114912 | A1 | 6/2006 | Kwan et al. | |
| 2008/0101229 | A1 | 5/2008 | Meleis et al. | |

(Continued)

OTHER PUBLICATIONS

Mark Hachman, Verizon API to Give Apps 'Turbo' Bandwidth Boost, Nov. 1, 2011, http://www.pcmag.com/article2/0,2817,2395728,00.asp.

(Continued)

Primary Examiner — Dustin Nguyen
Assistant Examiner — Hao Nguyen
(74) Attorney, Agent, or Firm — Merchant & Gould P.C.

(57) ABSTRACT

Allowing a subscriber to modify a data transfer rate or available bandwidth associated with an Internet subscription tier for a selected or predetermined time period is provided. Upon receiving an indication of a selection to decrease an allowed amount of bandwidth or to boost or increase a data transfer rate to a next available service tier, a request may be sent to a gateway device associated with the subscriber to override firmware on the gateway device to restrict access to an amount of bandwidth or to allow access to additional bandwidth respectively.

17 Claims, 8 Drawing Sheets

(56) References Cited

U.S. PATENT DOCUMENTS

| | | | |
|---|---|---|---|
| 2010/0020685 A1* | 1/2010 | Short | H04L 12/14 370/230 |
| 2010/0027560 A1* | 2/2010 | Yang | H04L 41/0896 370/468 |
| 2010/0180034 A1* | 7/2010 | Weiner | G06Q 30/04 709/226 |
| 2010/0299236 A1* | 11/2010 | Cassell et al. | 705/34 |
| 2011/0013537 A1* | 1/2011 | Paclik | H04L 41/0896 370/253 |
| 2012/0093508 A1* | 4/2012 | Baykal et al. | 398/58 |
| 2012/0257503 A1 | 10/2012 | Vrbaski et al. | |
| 2012/0315893 A1* | 12/2012 | Weppler | H04L 41/5022 455/424 |
| 2013/0046665 A1* | 2/2013 | Zabawskyj et al. | 705/34 |
| 2013/0223222 A1 | 8/2013 | Kotecha et al. | |

OTHER PUBLICATIONS

Co-Pending U.S. Appl. No. 13/681,364, filed Nov. 19, 2012.
U.S. Office Action dated Dec. 3, 2014 in U.S. Appl. No. 13/681,364, 21 pgs.

* cited by examiner

BANDWIDTH OVERRIDE

CROSS REFERENCE TO RELATED APPLICATIONS

This application is related to U.S. patent application Ser. No. 13/681,364, titled "Bandwidth Upgrade Recommendation," filed on Nov. 19, 2012, the entirety of each of which is incorporated by reference herein.

BACKGROUND

Access to a computer network system, such as the Internet, may be provided by Internet service providers (ISPs) to subscribers. Internet access may be provided to subscribers via different technologies (e.g., cable television (CATV), integrated services digital network (ISDN), digital subscriber line (DSL), etc.) at various data transfer rates according to various subscription tiers. A bandwidth amount or a data transfer rate associated with a subscription tier may be one determinant of subscription price such that a subscription tier with a higher amount of bandwidth or a higher data transfer rate may cost more than a subscription tier with a lesser amount of available bandwidth or a lower data transfer rate. For example, a subscriber who tends to be a light user and uses his Internet service for less bandwidth-intensive activities (e.g., checking emails, skimming news headlines, etc.) may choose a subscription tier with a lesser data transfer rate or bandwidth amount so as to not pay for capacity or speed that he may not be using. Alternatively, a subscriber who tends to be a heavier user and uses his Internet service for more bandwidth-intensive tasks (e.g., online gaming, video voice over Internet protocol (VoIP), etc.) may choose a subscription tier with a higher data transfer rate or bandwidth amount so as to not experience latency.

In many situations, a subscriber many desire or need more bandwidth or a higher data transfer rate for a certain task and/or for a certain time duration than what is provided by his current subscription tier. For example, a user may have a subscription tier providing transfer speeds of up to 15 megabits per second (Mbps) and may wish perform a bandwidth-intensive task (e.g., online gaming, streaming content). While the transfer speed offered with his current subscription tier may be adequate for the user's normal use, a higher performance speed may be desirable for a higher quality experience for the bandwidth-intensive task. Accordingly, the user may desire to be provided with additional bandwidth for performing the bandwidth-intensive task.

In other situations, a subscriber may wish to relinquish an amount of bandwidth apportioned to his subscription for a certain time duration. For example, a user may know of a time period during the day or another period of time (e.g., days, weeks, etc.) that he may not utilize Internet service and may be willing to relinquish an amount of bandwidth available to his subscription for the time period.

It is with respect to these and other considerations that the present invention has been made.

SUMMARY

Embodiments of the present invention provide for allowing a subscriber to modify a data transfer rate or available bandwidth associated with an Internet subscription tier for a selected or predetermined time period. Upon receiving an indication of a selection to boost or increase a data transfer rate or to decrease the data transfer rate, a request may be sent to a gateway device associated with the subscriber to override firmware on the gateway device to either allow access to additional bandwidth or to restrict access to an amount of bandwidth.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

Referring now to the drawings in which like reference numbers represent corresponding parts throughout.

DETAILED DESCRIPTION

Figure 1:
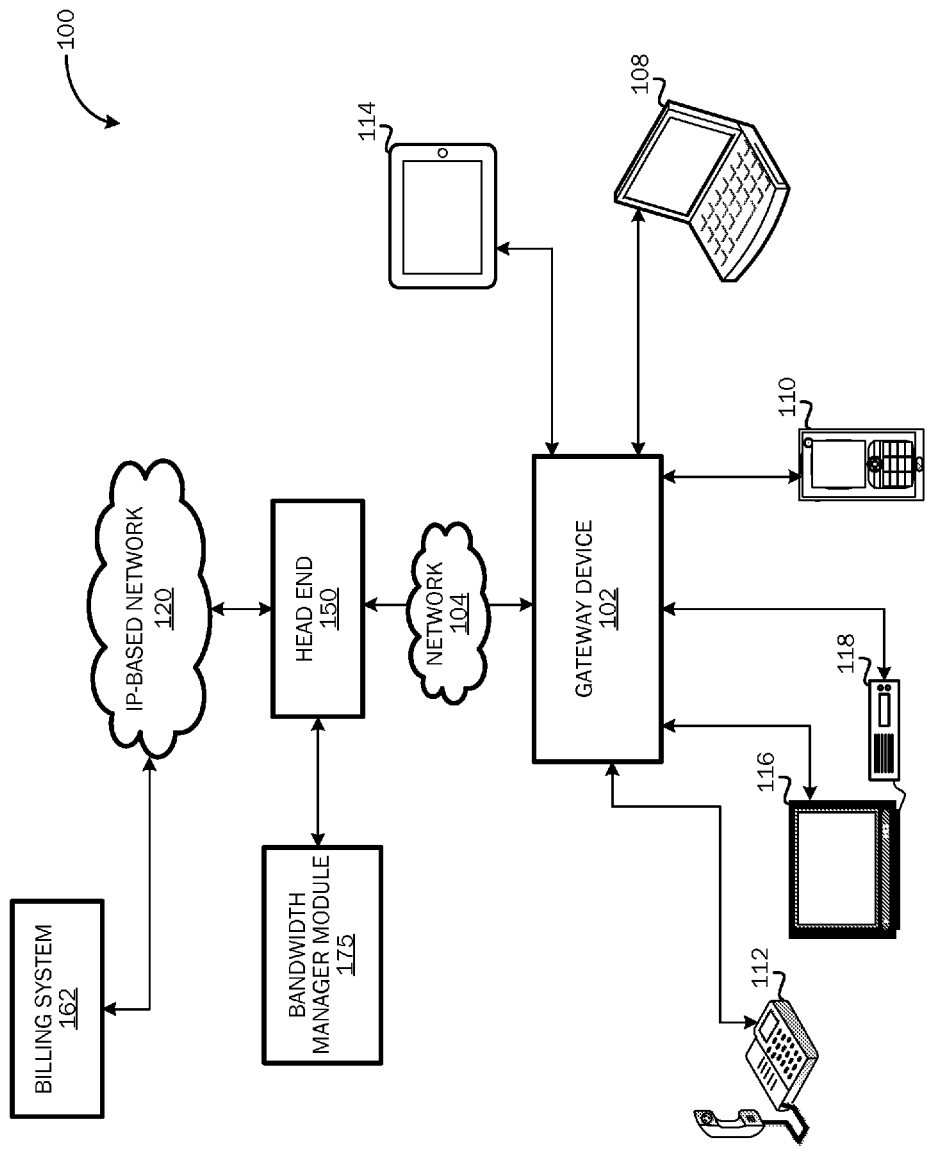
FIG. 1 is a diagram of an exemplary system for modifying bandwidth according to an embodiment.

Embodiments provide for allowing a subscriber to modify a data transfer rate or available bandwidth associated with an Internet subscription tier for a selected or predetermined time period. For example, a subscriber may choose to boost or increase his data transfer rate to a next available service tier to accommodate a particular need (e.g., stream a high quality video). Upon receiving an indication of a selection from a subscriber to modify his data transfer rate, a request may be sent to a gateway device associated with the subscriber to override firmware on the gateway device to either allow access to additional bandwidth or restrict access to an amount of bandwidth.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

FIG. 1 is a simplified block diagram illustrating a system 100 for providing adjustable bandwidth. As illustrated in FIG. 1, a variety of endpoint devices 108, 110, 112, 114, 116, 118 may connect via various types of network architectures 104 (e.g., hybrid fiber coax (HFC), digital subscriber line (DSL), mobile network, etc.) to access an IP-based network 120 such the Internet. Endpoint devices may include, but are not limited to, a computing device 108, a mobile communication device 110, a voice over Internet protocol (VoIP) phone 112, a tablet computing device 114, an Internet television 116, or a television connected to a networked device, such as a set top box (STB) 118. The system 100 may include a gateway device 102 (e.g., modem) for connecting one or more endpoint devices 108, 110, 112, 114, 116, 118 to a network 104,120. A variety of services may be provided through a network 104,120 including, for example, traditional digital and analog video programming, telephone services, high speed Internet access, video-on-demand, and information services. Services may be provided or distributed by a service provider head end 150. For example, the head end 150 may include an Internet service provider (ISP), CATV services provider, cellular services provider, etc. operable to data (e.g., video programming, telephone services, multimedia messages, Internet data, etc.) downstream to an endpoint device and receive data upstream from an access device or gateway device 102.

According to embodiments, the system 100 may include a bandwidth manager module 175 operable to adjust an amount of bandwidth available to a subscriber network access connection. The available bandwidth may be adjusted via various methods that may alter an upper boundary of a data transfer rate for an access connection. An altering of the upper boundary of the data transfer rate may be an override sent to a gateway device 102. According to an embodiment, the bandwidth manger module 104 may be further operable to determine if a bandwidth increase may be advantageous for a data transfer activity and accordingly provide a notification to a subscriber of a recommendation to adjust the bandwidth associated with a subscription. The bandwidth modification may be a temporary adjustment, for example, an increased bandwidth for an allotted amount of time to perform a bandwidth-intensive activity. The bandwidth manager module 175 may be located at a service provider head end 150, or may be located remotely and accessed by the head end 150 via a network, such as IP-based network 120.

A subscriber may be charged a fee for a bandwidth increase. According to an embodiment, a bandwidth increase fee may be calculated according to an amount of additional bandwidth and a time duration of the additional bandwidth. When a request to increase a data transfer rate is sent to a gateway device 102, a notification of the bandwidth increase may be provided to a billing system 162 associated with the service subscription such that a subscriber's account may be charged for the service upgrade. Alternatively, a subscriber may be given credit for a bandwidth decrease. For example, if a subscriber forfeits an amount of bandwidth during a peak hour, a credit may be applied to the subscriber's account. Accordingly, billing may be dynamically calculated depending on an allowed amount of bandwidth associated with the subscriber's network subscription.

According to one embodiment, bandwidth adjustment may be provided for a selected time period. For example, a subscriber may select to increase his bandwidth to a next available service tier for one hour, two hours, one day, one week, etc. Accordingly, the billing system 162 may receive a notification of the bandwidth increase for the selected time period and may apply a fee to an associated subscriber for the selected additional bandwidth amount and for the selected time period. According to another embodiment, a subscriber's subscription may remain at a modified bandwidth amount until the subscriber selects to readjust or decrease his available bandwidth. Accordingly, the subscriber may be charged an amount according to his subscription tier and may be charged an additional amount for the time period of the increased bandwidth. For example, if a user selects to increase his bandwidth halfway through a billing cycle and does not readjust his bandwidth amount until the end of the billing cycle, the subscriber may be billed at a first rate for the first half of the billing cycle and may be billed at a second higher rate for the second half of the billing cycle.

As described briefly above, embodiments may provide for determining a minimum data transfer rate needed to effectively perform a data transfer activity and providing a notification to a subscriber if the minimum data transfer rate needed to effectively perform the activity exceeds the amount of bandwidth available according to an associated subscription tier. According to one embodiment, data usage and bandwidth percentage may be calculated and monitored. Monitoring bandwidth usage may include determining an elevated level of bandwidth usage. For example, if a subscriber has a subscription with 3 Mbps of bandwidth and has selected to upload 100 photographs to an online photo sharing website, the percentage of bandwidth being used to perform the upload may be calculated. If a task (e.g., the upload of photographs) is consuming a predetermined percentage of bandwidth capacity (e.g., exceeding a bandwidth utilization threshold), a notification may be provided.

According to another embodiment, a roundtrip method may be utilized to determine a potential need for additional bandwidth. For example, if a time it takes a given network pack to travel form its source to its destination (e.g., endpoint device 108, 110, 112, 114, 116, 118 or gateway device 102) and back exceeds a predetermined threshold, a notification may be provided.

According to another embodiment, a subscriber's profile may be monitored for usage patterns. For example, a subscriber's usage pattern may indicate that a large amount of bandwidth is utilized during the times of 5:00 PM to 9:00 PM. Accordingly, upon detection of a peak bandwidth usage time, a notification may be provided.

According to another embodiment, data packet types may be inspected. For example, data packets may be analyzed for certain types of data, such as movies, games, etc. If a detection is made of a transfer of certain types of data packets that may be determined as bandwidth-intensive, a notification may be provided.

According to embodiments, various types of notifications may be provided. For example, a notification of a recommendation for a bandwidth increase may be provided as a text message, an email message, a pop-up window, or a selectable functionality control displayed in a user interface, in an application window, or on a web page.

Figure 2:
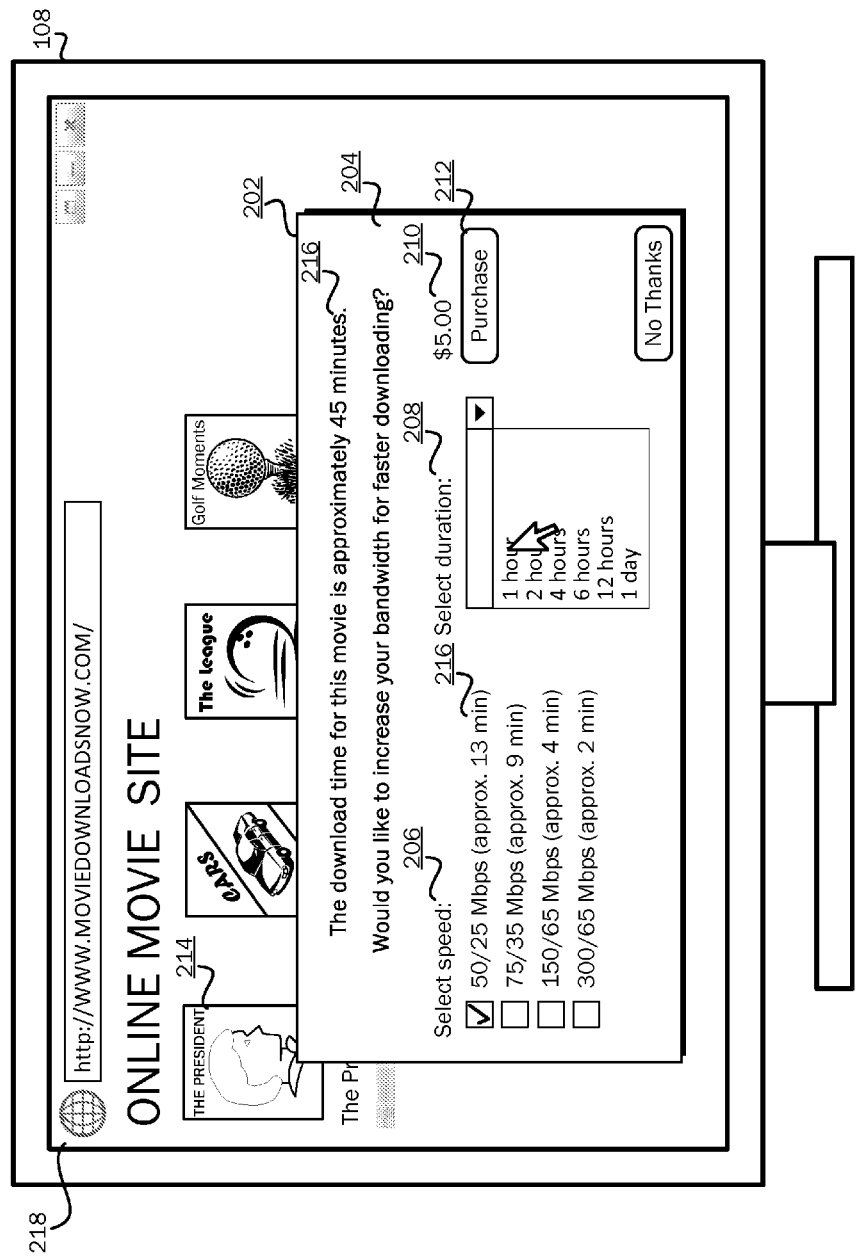
FIG. 2 is an illustration of an example of an additional bandwidth recommendation notification displayed on an endpoint device.

Referring to FIG. 2, an example of a notification 202 is illustrated. According to the example illustrated in FIG. 2, a subscriber may access a website 218, for example, a website offering movie downloads, and may select content, such as a movie 214 to download. Bandwidth monitoring may be performed, wherein a percentage of usage of available bandwidth associated with a communication path to a network access device or gateway device 102 or a rate of data transfer may be calculated. According to one embodiment, bandwidth monitoring may be performed by the bandwidth manager module 175. According to another embodiment, bandwidth monitoring may be performed by an application on the network access device or gateway device 102. According to yet another embodiment, bandwidth monitoring may be performed by a remote application and communicated to a gateway device 102, a head end 150, a bandwidth manager module 175 or to a third party application, for example, a third party application associated with the website offering movie downloads. According to a determined available bandwidth amount and/or a data transfer rate, an estimated data transfer time 216 may be calculated. A determination may be made to determine if additional bandwidth may be available to a subscriber such that the data transfer rate may be increased. According to an embodiment, a fee for additional bandwidth may be determined dynamically by communicating with a billing system. The fee may be determined based on such factors as how crowded the network is or how crowded the network is predicted to be.

If a percentage utilization of available bandwidth exceeds a predetermined threshold or if a rate of data transfer is below a predetermined threshold and if additional bandwidth or a higher data transfer rate is available, as illustrated in FIG. 2, a notification 202 may be presented. The notification 202 may be provided by the service provider (head end 150 or bandwidth manager module 175), the gateway device 102, or by a third party application. In this example, the notification 202 may be presented in the form of a pop-up window 204 and may include an estimated data transfer time 216. The notification 202 may include an interface for allowing a subscriber to select and purchase additional bandwidth for an increased data transfer rate. For example, the notification 202 may provide one or more data transfer rate options 206. Each data transfer rate option 206 may be associated with a service tier. A transfer rate selection 206 data transfer rate option may include an estimated data transfer time 216. The notification 202 may also include a selectable duration 208 for the increased bandwidth adjustment. For example, the subscriber may select a number of hours, days, weeks, or for a permanent bandwidth increase. An associated fee 210 may be provided, as well as a selectable user interface element 212 for completing the request for increased bandwidth.

Figure 3:
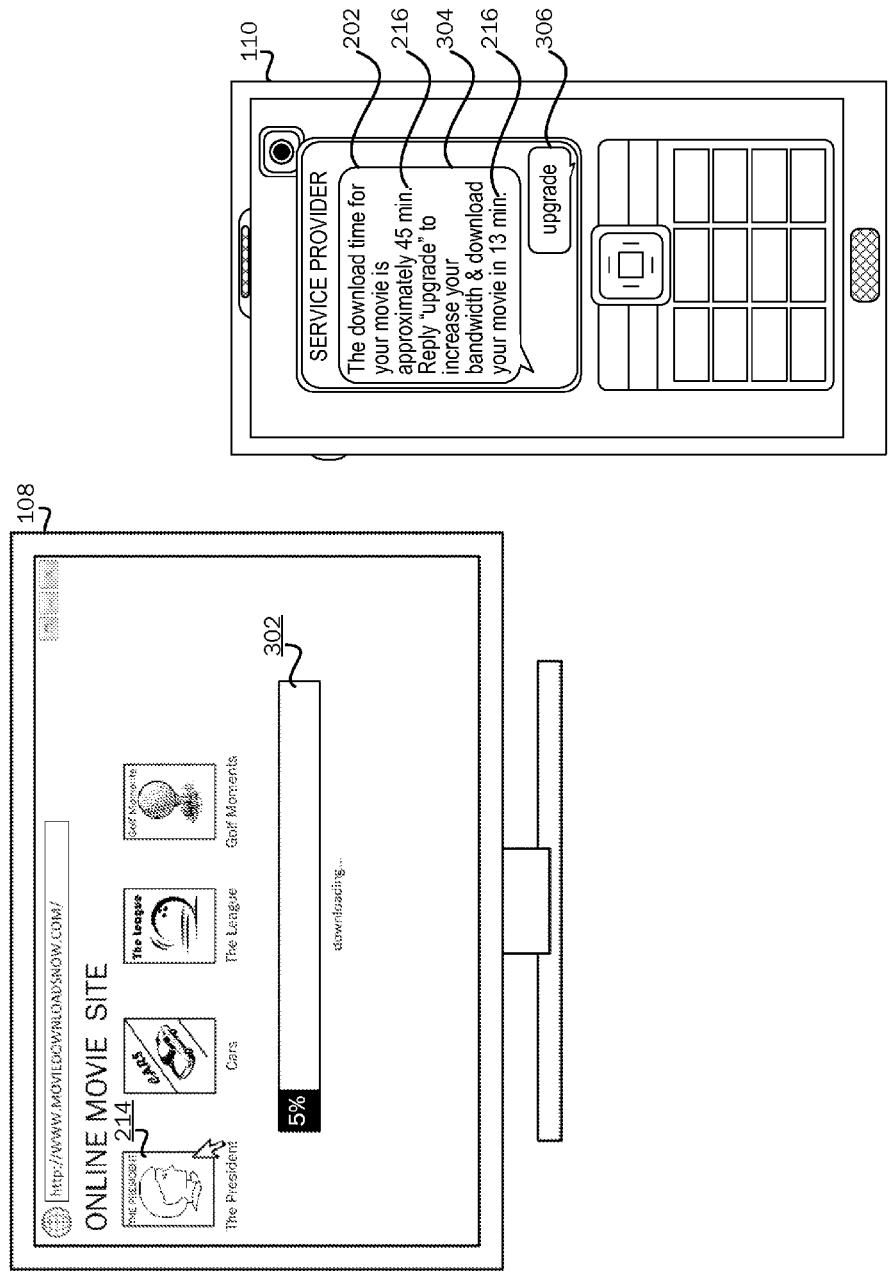
FIG. 3 is an illustration of an example of an additional bandwidth recommendation notification sent as a text message to a mobile communication device.

Referring now to FIG. 3, a notification 202 in the form of a text message 304 sent to a mobile communication device 110 is illustrated. Like in the example described in FIG. 2, bandwidth monitoring may be performed and a determination of availability of additional bandwidth may be made. As illustrated, progress of a data transfer activity may be displayed, for example, via a progress bar 302 and/or as a percent completion of the data transfer activity. According to embodiments, if a percentage utilization of available bandwidth exceeds a predetermined threshold or if a rate of data transfer is below a predetermined threshold and if additional bandwidth or a higher data transfer rate is available, as illustrated in FIG. 3, a notification 202 in the form of a text message 304 may be presented. For example the text message 304 notification 202 may be sent to a mobile communication device 110 associated with a subscriber requesting the data transfer activity. The text message 304 notification 202 may include an estimated data transfer time 216 and an option 306 for requesting increased bandwidth. For example, a reply to the text message may send a request to the bandwidth manager module 175 to increase the subscriber's bandwidth amount.

Figure 4:
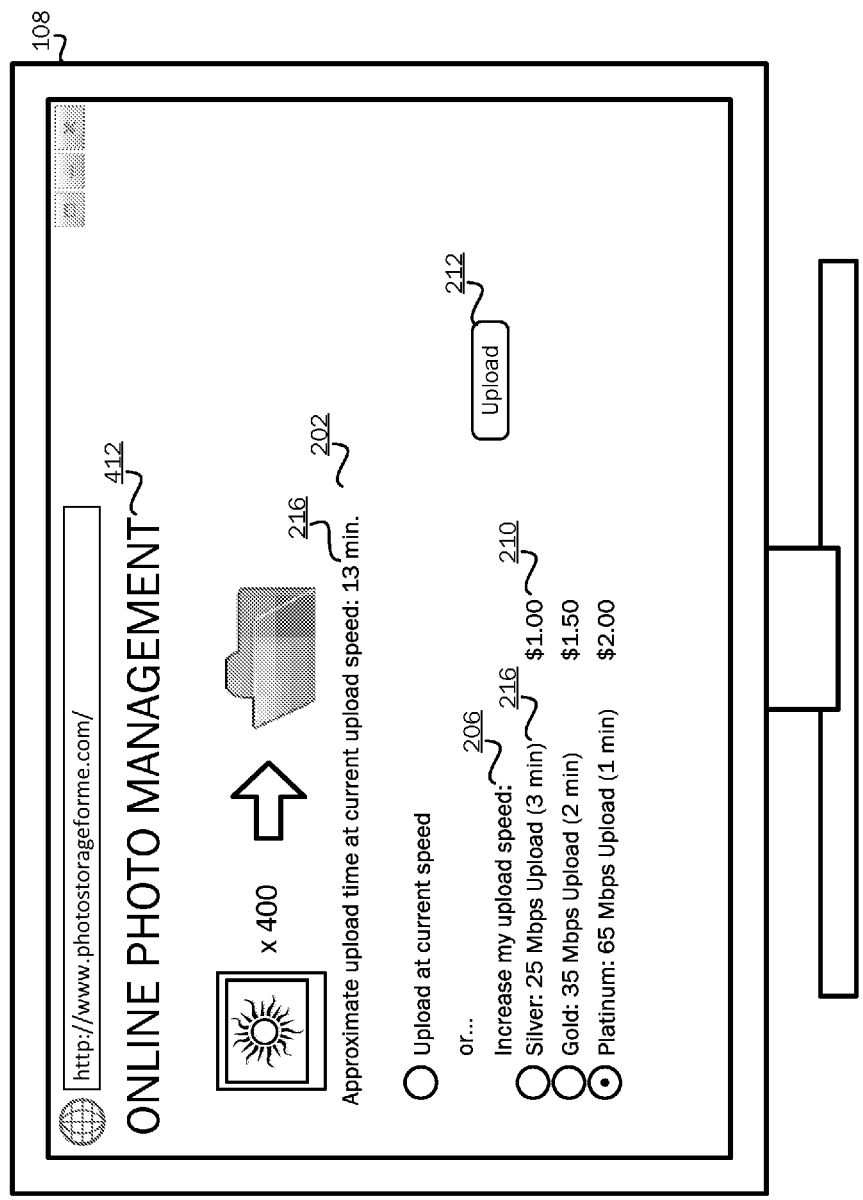
FIG. 4 is an illustration of an example of an additional bandwidth recommendation notification provided via a third party application.

As illustrated in FIG. 4, a notification 202 may be provided via a third party application. For example, a subscriber may utilize a third party application (e.g., online photo management application 412) for storing photographs on a remote server. The third party application may communicate with the subscriber's service provider's head end 150 and/or bandwidth manager module 175 to determine bandwidth usage, capacity, and availability. The third party application may also communicate with the subscriber's service provider's head end 150 and/or bandwidth manager module 175 to provide various selectable bandwidth decrease options or bandwidth increase options 206 and fees 210 associated with the various options 206. The bandwidth increase options 206 may or may not include selectable time durations of bandwidth increase. The notification 202 may include a selectable user interface element 212 for requesting a selected bandwidth increase option 206.

Figure 5:
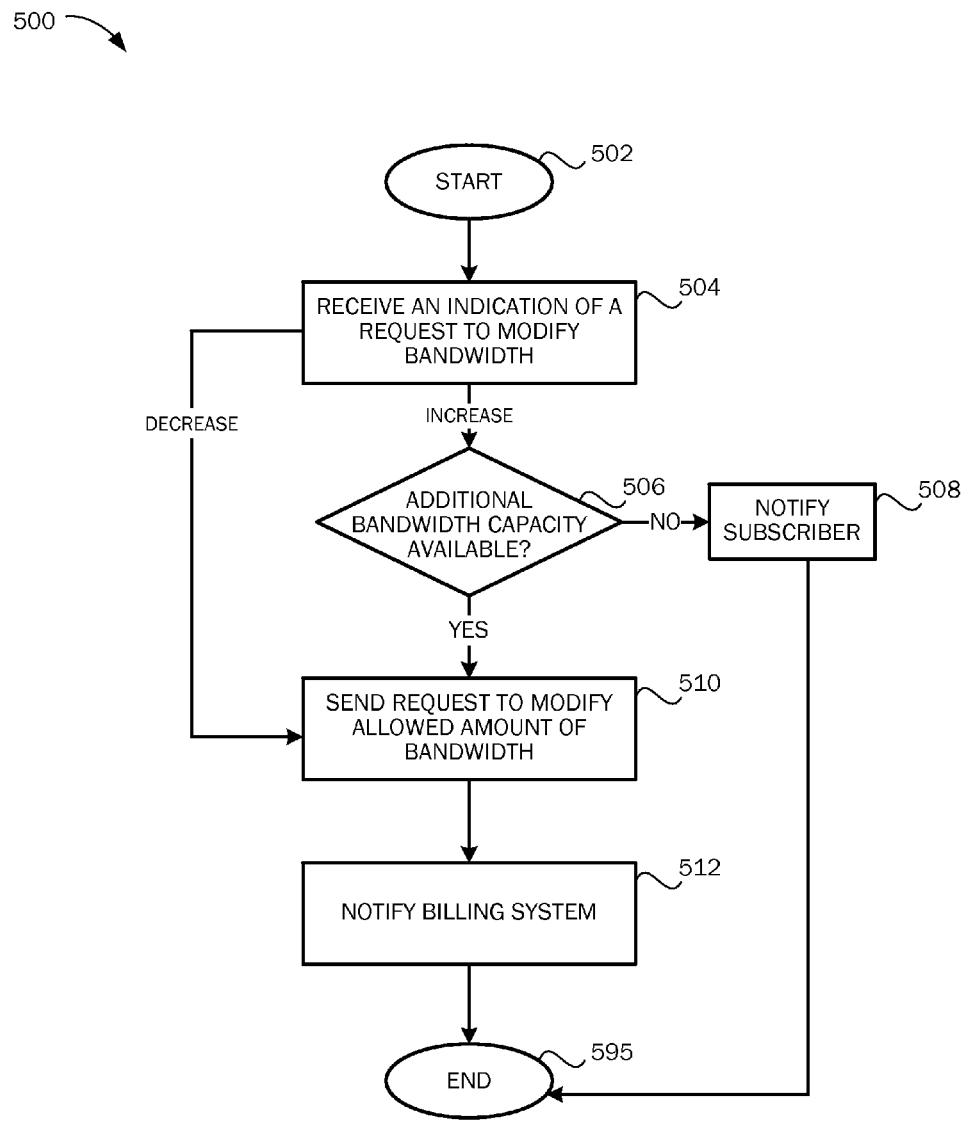
FIG. 5 is a flow chart of a method for sending a request for modifying bandwidth according to an embodiment.

Having described a system architecture 100 and various examples of bandwidth increase notifications, FIG. 5 illustrates a method 500 for receiving a request to modify a subscriber's bandwidth amount. Referring now to FIG. 5, the method 500 starts at OPERATION 502 and proceeds to OPERATION 504 where an indication of a request for a temporary bandwidth modification is received. The request for a temporary bandwidth modification may include a request to increase an allowed amount of bandwidth or may include a request to decrease an allowed amount of bandwidth. According to one embodiment, a request for a bandwidth increase may be in response to a notification 202 provided to a subscriber (e.g., a selection of a selectable user interface element 212 for selecting to increase bandwidth). According to another embodiment, the request for a bandwidth increase may not be in response to a notification 202. For example, a subscriber may wish to sample service at a next tier for a limited time duration without going through a subscription tier change.

If the request if for an increase of an allowed amount of bandwidth, the method 500 may proceed to DECISION OPERATION 506 to determine if additional bandwidth capacity if available for utilization by the subscriber. If additional bandwidth capacity is not available, the subscriber may be notified at OPERATION 508. If additional bandwidth capacity if available or if the request includes a request for a decrease of an allowed amount of bandwidth, the method 500 may proceed to OPERATION 510 where a request to modify the allowed amount of bandwidth may be sent. The request may include a request to access additional bandwidth or to relinquish an amount of bandwidth. The request may be sent to a head end 150 or to a gateway device 102. The request may utilize packetcable multimedia (PCMM) technology or other type of technology for providing quality of service (QoS) over a network. The request may override firmware on the subscriber's gateway device to allow access to increased data transfer rates or to restrict an amount of bandwidth. According to an embodiment, the firmware may be modified in such a manner as to minimize a subscriber's Internet usage. For example, a packet inspection application may detect when a user is not utilizing his Internet and may prompt the system to begin firmware modification. Alternatively, the modification may be performed at a known low-use time (e.g., early morning hours) to avoid impacting subscribers.

At OPERATION 512, a billing system 162 may be notified so that the subscriber's account may be billed dynamically. For example, if the subscriber requests a bandwidth increase, fees associated with additional bandwidth may be invoiced to the subscriber's account. If the subscriber requests a bandwidth decrease, a credit may be applied to the subscriber's account. The method 500 ends at OPERATION 595.

Figure 6:
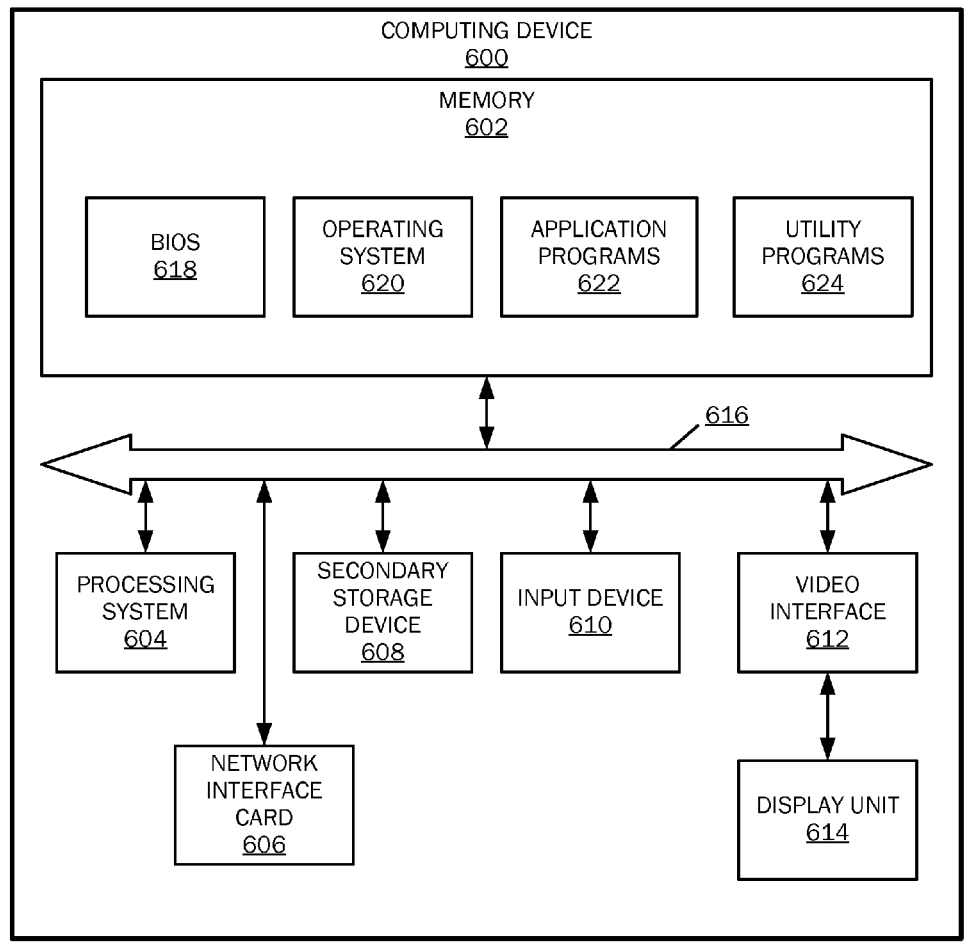
FIG. 6 is a block diagram illustrating example physical components of a computing device with which embodiments may be practiced.

FIG. 6 is a block diagram illustrating example physical components of a computing device 600 with which embodiments may be practiced. In some embodiments, one or a combination of the components the bandwidth manager module 175 may be implemented using one or more computing devices like the computing device 600. It should be appreciated that in other embodiments, the bandwidth manager module 175 may be implemented using computing devices having hardware components other than those illustrated in the example of FIG. 6.

Computing devices may be implemented in different ways in different embodiments. For instance, in the example of FIG. 6, the computing device includes a processing system 604, memory 602, a network interface 606, a secondary storage device 608, an input device 610, a video interface 612, a display unit 614, and a communication medium 616. In other embodiments, the computing device 600 may be implemented using more or fewer hardware components (e.g., a video interface, a display unit, or an input device) or in combination with other types of computer systems and program modules.

The memory 602 includes one or more computer-readable storage media capable of storing data and/or computer-executable instructions. According to one embodiment, bandwidth manager module 175 may be stored locally on computing device 600. Memory 602 thus may store the computer-executable instructions that, when executed by processor 604, cause a determination of a need for additional bandwidth and/or a request for a bandwidth modification as described above with reference to FIGS. 1-5.

In various embodiments, the memory 602 is implemented in various ways. For example, the memory 602 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 604 includes one or more processing units, which may include tangible integrated circuits that selectively execute computer-executable instructions. In various embodiments, the processing units in the processing system 604 are implemented in various ways. For example, the processing units in the processing system 604 can be implemented as one or more processing cores. In this example, the processing system 604 can comprise one or more Intel Core microprocessors. In another example, the processing system 604 can comprise one or more separate microprocessors. In yet another example embodiment, the processing system 604 can comprise Application-Specific Integrated Circuits (ASICs) that provide specific functionality. In yet another example, the processing system 604 provides specific functionality by using an ASIC and by executing computer-executable instructions.

The computing device 600 may be enabled to send data to and receive data from a communication network via a network interface card 606. In different embodiments, the network interface card 606 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 608 includes one or more computer-readable storage media, and may store data and computer-executable instructions not directly accessible by the processing system 604. That is, the processing system 604 performs an I/O operation to retrieve data and/or computer-executable instructions from the secondary storage device 608. In various embodiments, the secondary storage device 608 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 610 enables the computing device 600 to receive input from a user. Example types of input devices include, but are not limited to, keyboards, mice, trackballs, stylus input devices, key pads, microphones, joysticks, touch-sensitive display screens, and other types of devices that provide user input to the computing device 600.

The video interface 612 outputs video information to the display unit 614. In different embodiments, the video interface 612 is implemented in different ways. For example, the video interface 612 is a video expansion card. In another example, the video interface 612 is integrated into a motherboard of the computing device 600. In various embodiments, the display unit 614 can be a an LCD display panel, a touch-sensitive display panel, an LED screen, a projector, a cathode-ray tube display, or another type of display unit. In various embodiments, the video interface 612 communicates with the display unit 614 in various ways. For example, the video interface 612 can communicate with the display unit 614 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 616 facilitates communication among the hardware components of the computing device 600. In different embodiments, the communications medium 616 facilitates communication among different components of the computing device 600. For instance, in the example of FIG. 6, the communications medium 616 facilitates communication among the memory 602, the processing system 604, the network interface card 606, the secondary storage device 608, the input device 610, and the video interface 612. In different embodiments, the communications medium 616 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 602 stores various types of data and/or software instructions. For instance, in the example of FIG. 6, the memory 602 stores a Basic Input/Output System (BIOS) 618, and an operating system 620. The BIOS 618 includes a set of software instructions that, when executed by the processing system 604, cause the computing device 600 to boot up. The operating system 620 includes a set of software instructions that, when executed by the processing system 604, cause the computing device 600 to provide an operating system that coordinates the activities and sharing of resources of the computing device 600. The memory 602 also stores one or more application programs 622 that, when executed by the processing system 604, cause the computing device 600 to provide applications to users, for example, the bandwidth manager module 175. The memory 602 also stores one or more utility programs 624 that, when executed by the processing system 604, cause the computing device 600 to provide utilities to other software programs. Embodiments of the present invention may be utilized in various distributed computing environments where tasks are performed by remote processing devices that are linked through a communications network in a distributed computing environment.

Figures 7A, 7B:
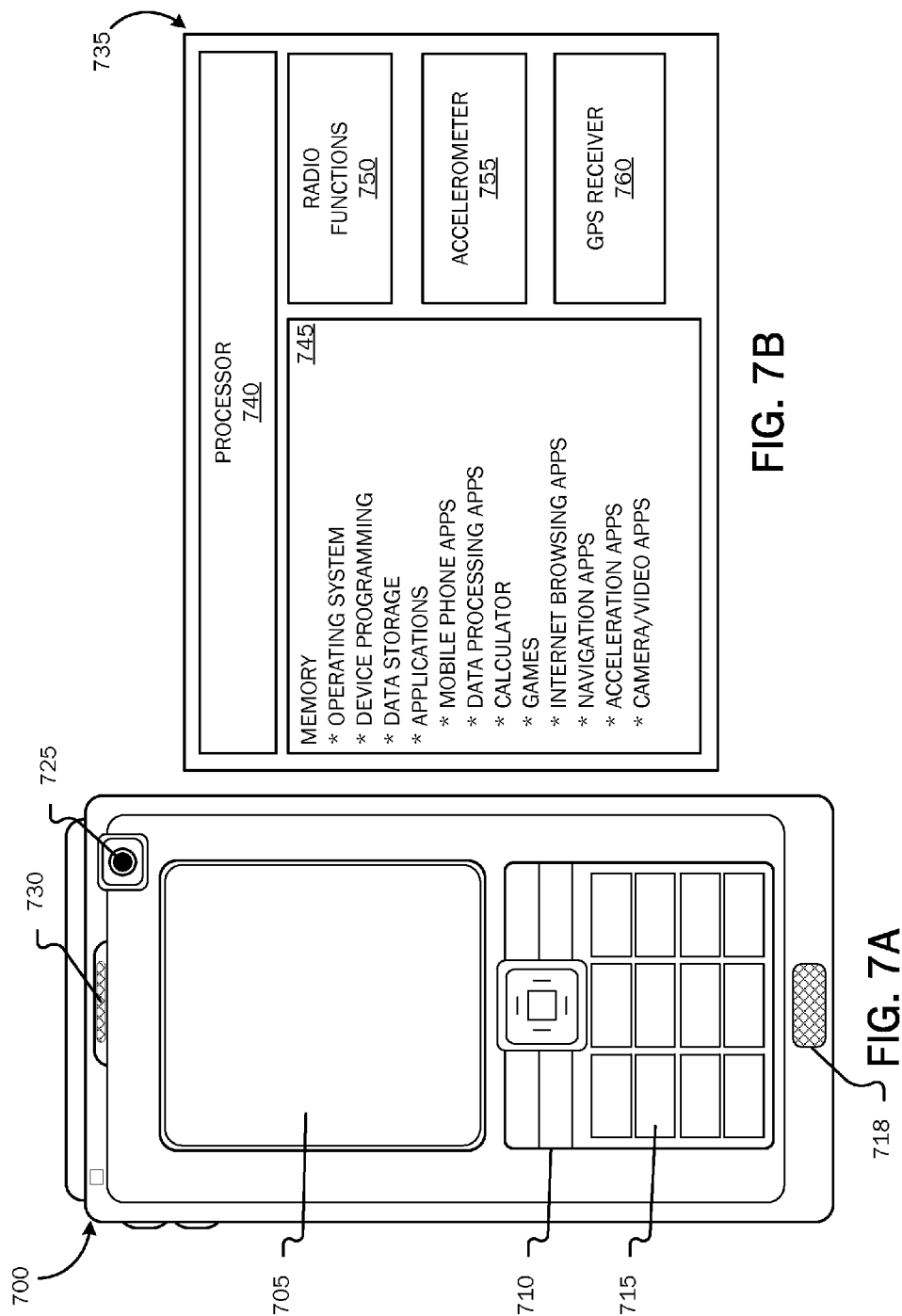
FIGS. 7A-7B illustrate a suitable mobile computing environment with which embodiments may be practiced.

FIGS. 7A-7B illustrate a suitable mobile computing environment, for example, a mobile computing device 700, a smart phone, a tablet personal computer, a laptop computer, and the like, with which embodiments may be practiced. The mobile computing device 700 is illustrative of any suitable device operative to send, receive and process wireless communications according to embodiments of the present invention. A display screen 705 is operative for displaying a variety of information such as information about incoming and outgoing communications, as well as, a variety of data and displayable objects, for example, text, alphanumeric data, photographs, and the like.

Data input to the device 700 may be performed via a variety of suitable means, such as, touch screen input via the display screen 705, keyboard or keypad input via a data entry area 710, key input via one or more selectable buttons or controls 715, voice input via a microphone 718 disposed on the device 700, photographic input via a camera 725 functionality associated with the mobile computing device, or any other suitable input means. Data may be output via the device 700 via any suitable output means, including but not limited to, display on the display screen 705, audible output via an associated speaker 730 or connected earphone system, vibration module for providing tactile output, and the like.

Referring now to FIG. 7B, operational unit 735 is illustrative of internal operating functionality of the mobile computing device 700. A processor 740 is illustrative of a general purpose computer processor for processing incoming and outgoing data and communications and controlling operation of the device and associated software applications via a mobile computing device operating system. Memory 745 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, one or more components of the bandwidth manager module 175 may be stored locally on mobile computing device 700.

Mobile computing device 700 may contain an accelerometer 755 for detecting acceleration, and can be used to sense orientation, vibration, and/or shock. Mobile computing device 700 may contain a global positioning system (GPS) system (e.g., GPS send/receive functionality) 760. A GPS system 760 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 750 include all required functionality, including onboard antennae, for allowing the device 700 to communicate with other communication devices and systems via a wireless network. Radio functions 750 may be utilized to communicate with a wireless or WIFI-based positioning system to determine a device's 700 location.

Figure 8:
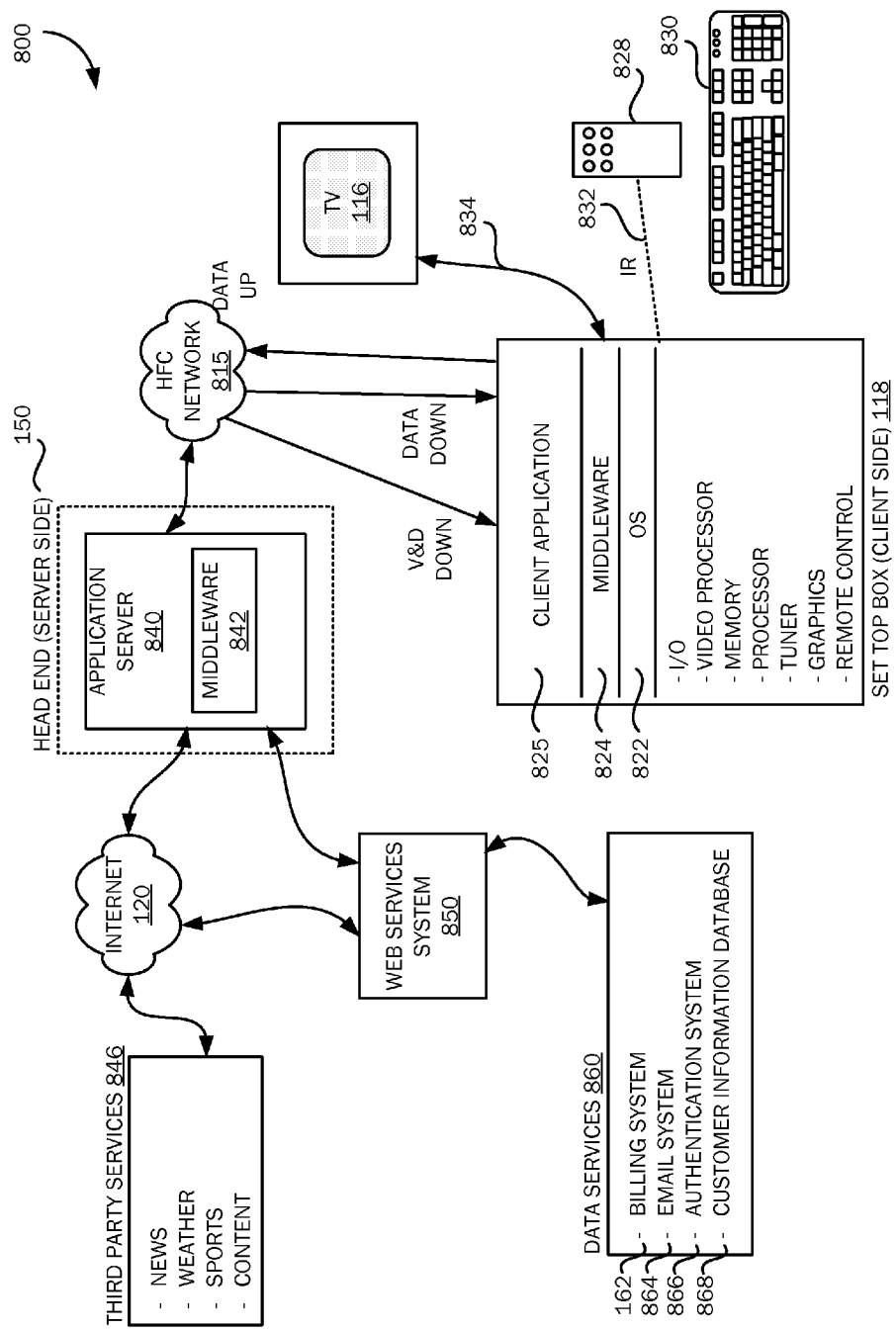
FIG. 8 is a simplified block diagram illustrating a cable television services system architecture providing an operating environment according to an embodiment.

FIG. 8 is a simplified block diagram illustrating a cable television services system 800 (hereafter referred to as "CATV") architecture providing an operating environment according to an embodiment. As can be appreciated, a CATV architecture is but one of various types of systems that may be utilized to provide additional bandwidth. Referring now to FIG. 8, digital and analog video programming, information content and interactive television services are provided via a hybrid fiber coax (HFC) network 815 to a television set 116 for consumption by a cable television/services system customer. As is known to those skilled in the art, HFC networks 815 combine both optical fiber and coaxial cable lines. Typically, optical fiber runs from the cable head end 150 to neighborhoods of subscribers. Coaxial cable runs from the optical fiber feeders to each customer or subscriber. The functionality of the HFC network 815 allows for efficient bidirectional data flow between the client-side set-top box 118 and a server-side application server 840.

The CATV system 800 is in the form of a distributed client-server computing system for providing video and data flow across the HFC network 815 between server-side services providers (e.g., cable television/services providers) via a server-side head end 150 and a client-side customer via a client-side set-top box (STB) 118 functionally connected to a customer receiving device, such as the television set 116. As is understood by those skilled in the art, modern CATV systems 800 may provide a variety of services across the HFC network 815 including traditional digital and analog video programming, telephone services, high speed Internet access, video-on-demand, and information services.

On the client side of the CATV system 800, digital and analog video programming and digital and analog data are provided to the customer television set 116 via the set-top box (STB) 118. Interactive television services that allow a customer to input data to the CATV system 800 likewise are provided by the STB 118. As illustrated in FIG. 8, the STB 118 is a multipurpose computing device having a computer processor, memory, and an input/output mechanism. The input/output mechanism receives input from server-side processes via the HFC network 815 and from customers via input devices such as the remote control device 828, keyboard 830, or other computing device, such as a tablet/slate computer 114, smart phone 110, etc. The remote control device 828 and the keyboard 830 may communicate with the STB 118 via a suitable communication transport such as the infrared connection 832. The STB 118 also includes a video processor for processing and providing digital and analog video signaling to the television set 116 via a cable communication transport 834. A multi-channel tuner is provided for processing video and data to and from the STB 118 and the server-side head end system 150, described below.

The STB 118 also includes an operating system 822 for directing the functions of the STB 118 in conjunction with a variety of client applications 825. For example, if a client application 825 requires a news flash from a third-party news source to be displayed on the television 116, the operating system 822 may cause the graphics functionality and video processor of the STB 118, for example, to output the news flash to the television 116 at the direction of the client application 825 responsible for displaying news items. According to embodiments, the operating system 822 may include the bandwidth manager module 175 as described herein.

Because a variety of different operating systems 822 may be utilized by a variety of different brands and types of set-top boxes, a middleware layer 824 may be provided to allow a given software application to be executed by a variety of different operating systems. According to an embodiment, the middleware layer 824 may include a set of application programming interfaces (APIs) that are exposed to client applications 825 and operating systems 822 that allow the client applications to communicate with the operating systems through common data calls understood via the API set. As described below, a corresponding middleware layer is included on the server side of the CATV system 800 for facilitating communication between the server-side application server and the client-side STB 118. The middleware layer 842 of the server-side application server and the middleware layer 824 of the client-side STB 118 may format data passed between the client side and server side according to the Extensible Markup Language (XML).

According to one embodiment, the set-top box 118 passes digital and analog video and data signaling to the television 116 via a one-way communication transport 834. According to other embodiments, two-way communication transports may be utilized, for example, via high definition multimedia (HDMI) ports. The STB 118 may receive video and data from the server side of the CATV system 800 via the HFC network 815 through a video/data downlink and data via a data downlink. The STB 118 may transmit data from the client side of the CATV system 800 to the server side of the CATV system 800 via the HFC network 815 via one data uplink. The video/data downlink is an "in band" downlink that allows for digital and analog video and data signaling from the server side of the CATV system 800 through the HFC network 815 to the set-top box 118 for use by the STB 118 and for distribution to the television set 116. As is understood by those skilled in the art, the "in band" signaling space operates at a relative high frequency, e.g., between 54 and 1000 megahertz. The signaling space is generally divided into 6 megahertz channels in which may be transmitted as a single analog signal or a greater number (e.g., ten) of digital signals.

The data downlink and the data uplink, illustrated in FIG. 8, between the HFC network 815 and the set-top box 118 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 118 and the server-side application server 840 is typically passed through the "out of band" data links. Alternatively, an "in band" data carousel may be positioned in an "in band" channel into which a data feed may be processed from the server-side application server 840 through the HFC network 815 to the client-side STB 118. Operation of data transport between components of the CATV system 800, described with reference to FIG. 8, is well known to those skilled in the art.

Referring still to FIG. 8, the head end 150 of the CATV system 800 is positioned on the server side of the CATV system and includes hardware and software systems responsible for originating and managing content for distributing through the HFC network 815 to client-side STBs 118 for presentation to customers via televisions 116. As described above, a number of services may be provided by the CATV system 800, including digital and analog video programming, interactive television services, telephone services, video-on-demand services, targeted advertising, and provision of information content.

The application server 840 is a general-purpose computing system operative to assemble and manage data sent to and received from the client-side set-top box 118 via the HFC network 815. As described above with reference to the set-top box 118, the application server 840 includes a middleware layer 842 for processing and preparing data from the head end of the CATV system 800 for receipt and use by the client-side set-top box 818. For example, the application server 840 via the middleware layer 842 may obtain data from third-party services 846 via the Internet 120 for transmitting to a customer through the HFC network 815 and the set-top box 118. For example, content metadata a third-party content provider service may be downloaded by the application server via the Internet 120. When the application server 840 receives the downloaded content metadata, the middleware layer 842 may be utilized to format the content metadata for receipt and use by the set-top box 118. Therefore, content metadata may be sent and categorized based on the availability to the customer's program guide data.

According to one embodiment, data obtained and managed by the middleware layer 842 of the application server 840 is formatted according to the Extensible Markup Language and is passed to the set-top box 118 through the HFC network 815 where the XML-formatted data may be utilized by a client application 825 in concert with the middleware layer 824, as described above. As should be appreciated by those skilled in the art, a variety of third-party services data, including news data, weather data, sports data and other information content may be obtained by the application server 840 via distributed computing environments such as the Internet 120 for provision to customers via the HFC network 815 and the set-top box 118.

According to embodiments, the application server 840 obtains customer support services data, including billing data, information on customer work order status, answers to frequently asked questions, services provider contact information, and the like from data services 860 for provision to the customer via an interactive television session. As illustrated in FIG. 8, the services provider data services 860 include a number of services operated by the services provider of the CATV system 800 which may include data on a given customer.

A billing system 162 may include information such as a customer's name, street address, business identification number, Social Security number, credit history, and information regarding services and products subscribed to by the customer. According to embodiments, the billing system 162 may also include billing data for services and products subscribed to by the customer for bill processing, billing presentment and payment receipt.

A customer information database 868 may include general information about customers such as place of employment, business address, business telephone number, and demographic information such as age, gender, educational level, and the like. The customer information database 868 may also include information on pending work orders for services or products ordered by the customer. The customer information database 868 may also include general customer information such as answers to frequently asked customer questions and contact information for various service provider offices/departments. As should be understood, this information may be stored in a variety of disparate databases operated by the cable services provider.

Referring still to FIG. 8, web services system 850 is illustrated between the application server 840 and the data services 860. According to embodiments, web services system 850 serves as a collection point for data requested from each of the disparate data services systems comprising the data services 860. According to embodiments, when the application server 840 requires customer services data from one or more of the data services 860, the application server 840 passes a data query to the web services system 850. The web services system formulates a data query to each of the available data services systems for obtaining any required data for a requesting customer as identified by a set-top box identification associated with the customer. The web services system 850 serves as an abstraction layer between the various data services systems and the application server 840. That is, the application server 840 is not required to communicate with the disparate data services systems, nor is the application server 840 required to understand the data structures or data types utilized by the disparate data services systems. The web services system 850 is operative to communicate with each of the disparate data services systems for obtaining necessary customer data. The customer data obtained by the web services system is assembled and is returned to the application server 840 for ultimate processing via the middleware layer 842, as described above.

An authentication system 866 may include information such as secure user names, subscriber profiles, subscriber IDs, and passwords utilized by customers for access to network services. As should be understood by those skilled in the art, the disparate systems 162, 864, 866, 868 may be integrated or provided in any combination of separate systems, wherein FIG. 8 shows only one example.

Embodiments the invention may be used in combination with any number of computer systems, such as in desktop environments, laptop or notebook computer systems, multiprocessor systems, micro-processor based or programmable consumer electronics, networked PCs, mini computers, main frame computers, mobile communication device systems and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-8. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for modifying an amount of bandwidth associated with a network subscription, the method comprising:
    connecting at least one endpoint device to a network of a service provider via a gateway device associated with a subscriber;
    providing a service over the network to the at least one endpoint device via the gateway device;
    analyzing for certain types of data that are bandwidth intensive;
    upon detection of bandwidth intensive data, receiving an indication of a request for a temporary bandwidth modification and sending from the subscriber a request to the gateway device to modify an allowed amount of bandwidth associated with a network subscription, wherein receiving an indication of a request for a temporary bandwidth modification comprises receiving an indication of a selection of a time duration for the modification of the allowed amount of bandwidth associated with the network subscription; and
    in response to sending the request to the gateway device associated with the subscriber, the subscriber overriding firmware on the gateway device to allow temporary access to additional downstream bandwidth to the at least one endpoint device of the subscriber via the overridden gateway device until a bandwidth intensive task is complete.

2. The method of claim 1, wherein sending a request to allow access to a higher bandwidth amount comprises utilizing packetcable multimedia (PCMM) technology.

3. The method of claim 1, further comprising sending a request to modify the allowed amount of bandwidth for the selected time duration.

4. The method of claim 1, wherein sending a request to modify an allowed amount of bandwidth associated with a network subscription comprises sending a request to modify the allowed amount of bandwidth until another request is received to modify the allowed amount of bandwidth associated with the network subscription.

5. The method of claim 1, wherein receiving an indication of a request for a temporary bandwidth modification comprises receiving a request via one of: a reply text message;

a selection of a selectable functionality control displayed in one of: a user interface; a third party application window; or on a webpage.

6. The method of claim 1, wherein receiving an indication of a request for a temporary bandwidth modification comprises receiving an indication of a request for a temporary decrease of an allowed amount of bandwidth.

7. The method of claim 1, wherein receiving an indication of a request for a temporary bandwidth modification comprises receiving an indication of a request for a temporary increase of an allowed amount of bandwidth.

8. The method of claim 7, wherein receiving an indication of a request for a temporary increase of an allowed amount of bandwidth is in response to a recommendation notification to increase the amount of bandwidth associated with the network subscription.

9. The method of claim 7, further comprising determining if additional bandwidth capacity is available.

10. The method of claim 9, wherein determining if additional bandwidth capacity is available comprises one or more of: determining if a next service tier including an additional bandwidth amount is available; or determining if an amount of bandwidth shared with other subscribers is available to allocate to the subscriber.

11. The method of claim 7, wherein receiving an indication of a request for a temporary increase of an allowed amount of bandwidth comprises receiving a request to allow access to a higher bandwidth amount for performing a data transfer activity.

12. A system for modifying an amount of bandwidth associated with a network subscription, the system comprising:
  a memory storage; and
  a processing unit coupled to the memory storage, wherein the processing unit is operable to:
    provide a service over a network of a service provider to an endpoint device via a gateway device associated with a subscriber;
    analyze for certain types of data that are bandwidth intensive;
    upon detection of bandwidth intensive data, receive an indication of a request for a temporary bandwidth modification and send from the subscriber a request to the gateway device to modify an allowed amount of bandwidth associated with a network subscription, wherein the request for the temporary bandwidth modification comprises a selection of a time duration for modification of the allowed amount of bandwidth associated with the network subscription; and
    in response to the request sent to the gateway device associated with the subscriber, the subscriber to override firmware on the gateway device to allow temporary access to additional downstream bandwidth to the endpoint device of the subscriber via the overridden gateway device until a bandwidth intensive task is complete.

13. The system of claim 12, wherein the request to modify an allowed amount of bandwidth associated with a network subscription comprises a request to modify the allowed amount of bandwidth until another request is received to modify the allowed amount of bandwidth associated with the network subscription.

14. The system of claim 12, wherein the request for a temporary bandwidth modification comprises a request for a temporary decrease of an allowed amount of bandwidth.

15. The system of claim 14, wherein the processing unit is further operable to notify a billing system associated with the network subscription to apply a billing credit for relinquishing an amount of bandwidth.

16. The system of claim 12, wherein the request for a temporary bandwidth modification comprises a request for a temporary increase of an allowed amount of bandwidth.

17. A computer readable storage device having computer-executable instructions for modifying an allowed amount of bandwidth associated with a network subscription, comprising:
  analyzing for certain types of data that are bandwidth intensive;
  receiving an indication of a request for a temporary modification to an allowed amount of bandwidth associated with a network subscription via a network of a service provider provided via a gateway device associated with a subscriber, the request including:
    a selection of a time duration for the modification of the allowed amount of bandwidth;
    if the request comprises a request for increasing the allowed amount of bandwidth, determining if additional bandwidth capacity is available;
    if bandwidth intensive data is detected, sending from the subscriber a request to the gateway device to modify the allowed amount of bandwidth for the selected time duration; and
  in response to sending the request to the gateway device associated with the subscriber, the subscriber overriding firmware on the gateway device to allow temporary access to additional downstream bandwidth to an endpoint device of the subscriber via the overridden gateway device until a bandwidth intensive task is complete.

* * * * *